United States Patent Office 3,236,835
Patented Feb. 22, 1966

3,236,835
PREPARATION OF ETHYLIDENEDIAMINES
Warren J. Rabourn, Lake Jackson, Tex., assignor to The Dow Chemical Company, Midland, Mich., a corporation of Delaware
No Drawing. Filed Nov. 24, 1961, Ser. No. 155,534
15 Claims. (Cl. 260—239)

The present invention relates to ethylidenediamines and to processes for making such compounds.

The compounds of the invention having the formula $$A-CH(CH_3)A'$$

wherein A and A' represent dialkylamino, dialkenylamino, alkylalkenylamino or morpholino radicals or radicals having the formula.

wherein $n$ is an integer from 1 to 5. Thus, they can be represented by the formula

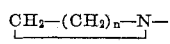

wherein in this and succeeding formulas R, $R_1$ $R_2$ and $R_3$ are the same or different organic radicals and wherein either the pair R and $R_1$ or the pair $R_2$ and $R_3$, or both, may be joined together to form with the N to which they are attached a morpholino radical or a radical having the formula

wherein $n$ has the aforesaid meaning.

Compounds of the above type are produced by the reaction of a secondary amine, $R_2NHR_3$, with either a vinylamine having the formula

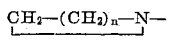

or an ethylidenediamine having the formula

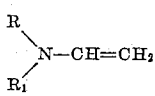

wherein $R_4$ and $R_5$ are radicals selected from the same group as are R, $R_1$, $R_2$ and $R_3$, and wherein at least one of the amino radicals

and

is different from the corresponding group in the reactant amine, $R_2NHR_3$. The reaction with the vinylamine is a simple addition to the vinyl double bond:

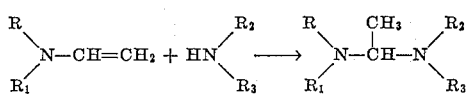

The reaction with the ethylidenediamine is an amine interchange in which one or both amino groups of the ethylidenediamine are replaced:

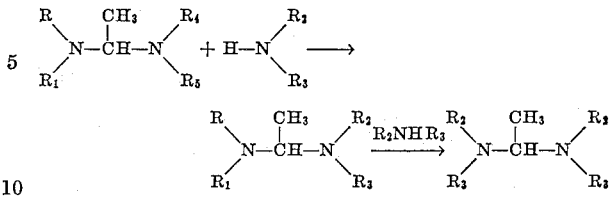

Vinylamines suitable for use as the first reactant in the above equation include the dialkylvinylamines wherein the alkyl radicals are the same or different, the alkenylalkylvinylamines, the dialkenylvinylamines, the N-vinylazacycloalkanes, and the like. Specific amines include dimethylvinylamine, methylethylvinylamine, diethylvinylamine, dibutylvinylamine, dioctylvinylamine, diallylvinylamine, allylmethylvinylamine, dihexenylvinylamine, octylcrotylvinylamine, di(methallyl)vinylamine, N-vinylaziridine, -azetidine, -pyrrolidine, -piperidine, -azacycloheptane, and the like.

Amines suitable for use as the second reactant in either of the above reactions include dialkylamines, alkylalkenylamines, dialkenylamines, azacycloalkanes, and the like. Thus, one can use dimethylamine, diethylamine, dihexylamine, dioctylamine, methylbutylamine, butylallylamine, amylmethallylamine, diallylamine, dicrotylamine, dioctenylamine, and the like, aziridine, azetidine, pyrrolidine, morpholine and the like.

In addition to the above second group of amines, various di-secondary-amines free of interfering groups can be used in the process of the invention. Among such are piperazine, and N,N'-dialkyl-alkylenediamines; for example, N,N'-dimethyl- or dibutyl-ethylenediamine or -propylenediamine. When such diamines are used, the resulting product may be the bis(1-aminoethyl)ethylenediamine formed by a reaction analogous to that shown by the above equation or, if the configuration of the diamine is such as to favor ring closure, an imidazolidine or analogous heterocyclic product. Thus, from piperazine the product having the following formula can be made:

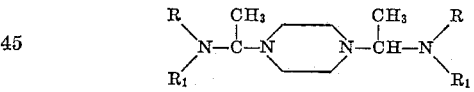

Further reaction with additional piperazine produces polymeric resins. Similarly, N,N'-dimethylethylenediamine produces initially a product having the formula

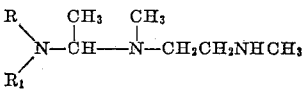

or

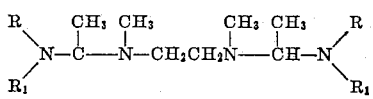

depending on the proportions of reactants used. The first of these products can be cyclized to produce the corresponding imidazolidine by an intramolecular amine interchange:

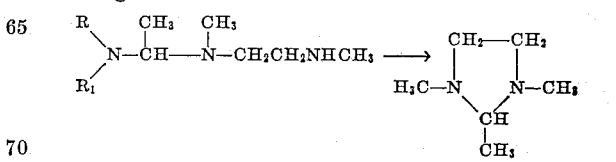

Because of the ease with which this cyclization occurs, the imidazolidine is usually the principal product actually isolated from the above reaction.

The above vinylamine reaction proceeds vigorously at room temperature without any catalyst. Since it is strongly exothermic, it is usually advisable to provide cooling means to control the temperature during the mixing of the reactants. The amine interchange reaction is slower but proceeds readily without a catalyst at temperatures of 20–100° C.

The processes of the invention are especially useful for the preparation of unsymmetrical ethylidenediamines; that is, products having the formula shown above wherein $R_2$ and $R_3$ are not the same as R and $R_1$, respectively, this being a genus for which no practical synthesis has heretofore been available.

The practice of the invention is illustrated by the following examples.

GENERAL PROCEDURE

One-half mole of N,N-dimethylvinylamine was mixed at room temperature with one-half mole of a secondary amine and the mixture was allowed to stand 18 hours, after which the reaction mixture was fractionally distilled under reduced pressure to isolate the corresponding 1-(dimethylamino)-1-(substituted amino)ethane. The results of several typical experiments are shown in the following table.

Table I

ETHYLIDENEDIAMINES

| Example No. | 1-Dimethylamino-1-(Substituted Amino) Ethane | | | | Yield, Percent |
|---|---|---|---|---|---|
| | Sec.-Amine | B.P., °C. | $N_D^{25}$ | $d_4^{25}$ | |
| 1 | Dimethylamine | 46 (80 mm.) | 1.4166 | | 71 |
| 2 | Diethylamine | 25 (6 mm.) | 1.4245 | 0.781 | 35 |
| 3 | Diallylamine | 45 (2 mm.) | 1.4515 | .822 | 37 |
| 4 | Piperidine | 43 (3 mm.) | 1.4570 | .861 | 45 |
| 5 | Morpholine | 48 (1 mm.) | 1.4558 | .926 | 36 |
| 6 | Aziridine | 33 (20 mm.) | 1.4315 | .835 | 60 |
| 7 | Pyrrolidine | 52 (10 mm.) | 1.4525 | .859 | 47 |

Other non-aromatic secondary amines free of reactive substituents can be used instead of the secondary amines shown above, the products being the corresponding ethylidenediamines. Such secondary amines include dipropylamine, dibutylamine, methylethylamine, allylpropylamine, alkyl-substituted aziridines, pyrrolidines, piperidines, morpholines, piperazines and the like wherein the alkyl radicals are attached to a carbon atom in the ring, and in general, the non-aromatic secondary amines.

While the above examples show the use of dimethylvinylamine as one of the reactants, other vinyl tertiary amines can be used similarly to prepare the corresponding ethylidenediamines. Suitable amines include diethyl-, dipropyl-, dibutyl- and other dialkylvinylamines, diallyl-, propylallyl- and butylallylvinylamines, heterocyclic non-aromatic vinylamines, such as N-vinyl-aziridine, -pyrrolidine, -piperidine, -morpholine, and the like, and in general, any N-vinyl tertiary amine free of interfering substituents. Many of these vinyl tertiary amines are known and others can be made by the same general procedures used for the known compounds. Others can be made by the procedures disclosed in British Patent 832,078 or those described in my copending application for United States Patent entitled "Process for Preparation of N,N-Dialkylvinylamines," Serial No. 114,681, filed June 5, 1961, now U.S. Patent 3,149,164. The amine interchange reaction can be effected by allowing a mixture of an ethylidenediamine and a secondary amine to stand several hours, or even days, at room temperature or, preferably, by gently heating the mixture. Suitable temperatures are, for instance, about 20 to 100° C. When, as is usually the case, the byproduct amine has a lower boiling point than the reactant amine, the former can be distilled from the reaction mixture as rapidly as it is formed, thus accelerating the reaction and driving it toward completion.

The vinylamine addition reaction and the ethylidenediamine amine interchange reaction can, and usually do, proceed concurrently. Thus, in the above examples, the corresponding symmetrical ethylidenediamines were obtained in low yields even though the proportions of reactants were deliberately chosen to disfavor this result. These products are tabulated in Table II, the example numbers corresponding to those in Table I. Example 8, in which aniline was the reactant amine, does not appear in Table I because none of the asymmetrical ethylidenediamine was isolated.

Table II

SYMMETRICAL ETHYLIDENEDIAMINES

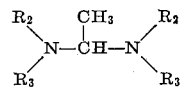

| Example No. | $R_2$ \ N— / $R_3$ | B.P., °C. | Pressure, mm. | $N_D^{25}$ | $d_4^{25}$ | Yield, Percent |
|---|---|---|---|---|---|---|
| 3A | Diallylamino | 75–76 | 2.0 | 1.4725 | 0.8480 | 11 |
| 4A | Piperidino | 85–88 | 2.5 | 1.4828 | .9098 | 22 |
| 5A | Morpholino | 65–69 | 0.5 | 1.4835 | 1.0360 | 20 |
| 7A | Pyrrolidino | 66 | 3.0 | 1.4785 | .9129 | 16 |
| 8 | Anilino | 47–52 | 0.5 | 1.6008 | 1.0600 | 49 |
| 9 a | CH₃ CH₃ \| \| —N N— \| \| CH₂—CH₂ | 65–70 | 110.0 | 1.4345 | .8240 | 70 | a The product was 1,2,3-trimethylimidazolidine and was made by the reaction of one mole each of N,N'-dimethylethylenediamine and dimethylvinylamine.

The production of symmetrical ethylidenediamines in the reaction of an N-vinyl tert.-amine with the amine $R_2NHR_3$ is greatly increased by the use of more than one molar equivalent of the latter, based on the vinylamine, and by the use of elevated temperatures (e.g., 30–100° C.) and longer reaction times and, when feasible, by the removal of the by product amine as it is formed.

When azacycloheptane (hexamethyleneimine) was reacted with dimethylvinylamine as in the above examples, little of the expected 1-(dimethylamino)-1-(N-azacycloheptyl)ethane was obtained. Two other products were isolated, N-vinylazacycloheptane and the dimer of the latter, 1,3-bis(N-azacycloheptyl)-1-butene. Both of these latter products are valuable as vinyl monomers and can be polymerized and copolymerized by the methods used with other N-vinyl monomers.

The ethylidenediamines of the invention are useful for a wide variety of purposes. They contain two basic tertiary amino groups. These make the compounds useful as organic bases. Such bases are widely used as absorbers for acid gases, such as carbon dioxide, hydrogen chloride and hydrogen sulfide, and as catalysts for a wide variety of chemical reactions. By thermal decomposition at about 250–400° C. they lose one amino group and produce an N-vinyl tertiary amine which may be different from that used in the above synthesis. The latter, in turn, can be catalytically hydrogenated to produce the corresponding N-ethyl tertiary amines, a class for which no other practical general synthesis is available.

In addition to the above uses, the novel compounds of the invention are useful as pesticides, including such diverse activities as insecticides, rodenticides, and nematocides. Thus, for example, 1-aziridinyl-1-dimethylaminoethane, the product of Example 6, is 100% effective in killing mice when fed at a dosage of 0.1 g. per kilogram of animal weight. Similarly, 1,1-bis(dimethylamino)ethane, the product of Example 1, when mixed with soil at a dosage of 10 parts per million, is 100% effective in killing root-knot nematodes. Beside being active in free radical polymerizations, the allylamine derivative of Example 3 shows utility as a soil-bonding agent. Some of the amines, particularly the pyrrolidinyl derivative of Example 7, are toxic to certain harmful insects when applied as dusts or sprays.

The ethylidenediamines of the invention are useful as chemical intermediates. For instance, they can be used to make vinylamines as disclosed in my copending application cited above. Such vinylamines are valuable monomers which can be polymerized and copolymerized by conventional techniques used with other N-vinyl compounds. The compounds of the invention can also be cleaved to make the corresponding N-halomethyl-tertiary-amines as taught by Bohme and Hartke, Ber. 93, 1305 (1960).

I claim:

1. The process for making a compound having the formula

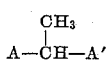

wherein A and A′ represent amino radicals selected from the group consisting of dialkylamino, dialkenylamino, alkylalkenylamino and morpholino radicals and radicals having the formula

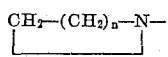

wherein $n$ is an integer from 1 to 5, said process comprising the steps of reacting by contacting a first amine having the formula A′H with a second amine having the formula $$A-CH=CH_2$$

wherein A and A′ have the same significance as above.

2. The process defined in claim 1 wherein the first amine is a dialkylamine.
3. The process defined in claim 1 wherein the first amine is a dialkenylamine.
4. The process defined in claim 1 wherein the first amine is morpholine.
5. The process defined in claim 1 wherein the first amine has the formula

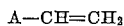

wherein $n$ is an integer from 1 to 5.

6. The process defined in claim 1 wherein a dialkylamine is reacted by contacting with an N-vinyldialkylamine.
7. The process defined in claim 1 wherein a dialkenylamine is reacted with an N-vinyldialkylamine.
8. 1-aziridinyl-1-(dimethylamino)ethane.
9. The process defined in claim 1 wherein A′ represents the aziridinyl radical.
10. The process for making 1-(1-aziridinyl)-1-(dimethylamino)ethane comprising reacting by contacting aziridine with N,N-dimethylvinylamine.
11. The process defined in claim 7 wherein the dialkenylamine is diallylamine.
12. The process for making 1-(diallylamino)-1-(dimethylamino)ethane comprising reacting by contacting diallylamine with N,N-dimethylvinylamine.
13. The process for making 1-(1-piperidino)-1-(dimethylamino)ethane comprising reacting by contacting piperidine with N,N-dimethylvinylamine.
14. The process for making 1-(4-morpholinyl)-1-(dimethylamino)ethane comprising reacting by contacting morpholine with N,N-dimethylvinylamine.
15. The process for making 1-(1-pyrrolidinyl)-1-(dimethylamino)ethane comprising reacting by contacting pyrrolidine with N,N-dimethylvinylamine.

References Cited by the Examiner
UNITED STATES PATENTS

| | | | |
|---|---|---|---|
| 2,270,681 | 1/1942 | De Groote | 260—583 |
| 2,675,382 | 4/1954 | Melamed | 260—247.5 |
| 3,025,313 | 3/1962 | Gunderson | 260—247.5 |
| 3,046,274 | 7/1962 | Bohme et al. | 260—247.5 |

IRVING MARCUS, *Primary Examiner.*